US011522751B1

(12) United States Patent
Maskara et al.

(10) Patent No.: US 11,522,751 B1
(45) Date of Patent: Dec. 6, 2022

(54) TRIGGERING RECOVERY ACTIONS BASED ON CORROBORATING ANOMALIES

(71) Applicant: Microsoft Technology Licensing, LLC, Redmond, WA (US)

(72) Inventors: Rajesh Kumar Maskara, Redmond, WA (US); Srinivasachakrapani Kotipalli, Sammamish, WA (US); Saurabh Vats, Seattle, WA (US); Irina Andreea Rosoiu, Bellevue, WA (US); Malvika Modi, Bellevue, WA (US); Fangwen Yu, Suzhou (CN); Liting Zhao, Suzhou (CN); Zhenguo Yang, Suzhou (CN); Bradley David Rutkowski, Woodinville, WA (US); Todd Carlyle Luttinen, Redmond, WA (US); Xuelin Chen, Suzhou (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/327,174

(22) Filed: May 21, 2021

(51) Int. Cl.
*H04L 41/069* (2022.01)
*H04L 41/0681* (2022.01)
*H04L 41/12* (2022.01)
*H04L 41/142* (2022.01)

(52) U.S. Cl.
CPC ........ *H04L 41/069* (2013.01); *H04L 41/0681* (2013.01); *H04L 41/12* (2013.01); *H04L 41/142* (2013.01)

(58) Field of Classification Search
CPC ... H04L 41/069; H04L 41/0681; H04L 41/12; H04L 41/142
See application file for complete search history.

(56) References Cited

U.S. PATENT DOCUMENTS

| | | | |
|---|---|---|---|
| 8,689,280 B2* | 4/2014 | Spektor | H04L 41/0893 709/239 |
| 8,931,095 B2* | 1/2015 | Ramsey | H04L 63/1408 713/153 |
| 9,544,321 B2* | 1/2017 | Baikalov | H04L 63/1425 |
| 10,862,749 B1* | 12/2020 | Kiyak | H04L 45/50 |
| 10,902,062 B1* | 1/2021 | Guha | H04L 41/16 |
| 11,178,107 B2* | 11/2021 | Schloss | H04L 63/0236 |
| 2007/0156919 A1* | 7/2007 | Potti | H04L 9/40 709/238 |

(Continued)

OTHER PUBLICATIONS

Grigorik, et al, "Network Error Logging", Retrieved from: https://w3c.github.io/network-error-logging/, Nov. 23, 2020, 50 pages (Year: 2020).*

(Continued)

*Primary Examiner* — Philip C Lee
(74) *Attorney, Agent, or Firm* — Workman Nydegger

(57) ABSTRACT

The present application describes a detect, alert and recovery system for various cloud-based and/or network-based services. The detect, alert and recovery system receives network performance data associated with a particular namespace from various network information sources. The network performance data may be aggregated based on various scopes. The aggregated data is then analyzed to determine whether an anomaly exists. If an anomaly exists, the detect, alert and recovery system may cause the performance of various actions in order to address the anomaly.

20 Claims, 9 Drawing Sheets

(56) References Cited

U.S. PATENT DOCUMENTS

2014/0059208 A1* 2/2014 Yan .................. H04L 43/16
709/224
2016/0352762 A1* 12/2016 Friedlander ......... H04L 63/1425

OTHER PUBLICATIONS

"Autonomous system (Internet)", Retrieved from: https://en.wikipedia.org/wiki/Autonomous_system_%28Internet%29, Mar. 9, 2021, 5 Pages.

"Microsoft 365 network health status", Retrieved from: https://connectivity.office.com/status, Retrieved Date: Feb. 26, 2021, 1 Page.

Gillum, et al., "Singleton orchestrators in Durable Functions (Azure Functions)", Retrieved from: https://docs.microsoft.com/en-us/azure/azure-functions/durable/durable-functions-singletons?tabs=csharp, Sep. 10, 2020, 3 Pages.

Gillum, et al., "What are Durable Functions?", Retrieved from: https://docs.microsoft.com/en-us/azure/azure-functions/durable/durable-functions-overview?tabs=csharp, Dec. 23, 2020, 19 Pages.

Grigorik, et al., "Network Error Logging", Retrieved from: https://w3c.github.io/network-error-logging/, Nov. 23, 2020, 50 Pages.

* cited by examiner

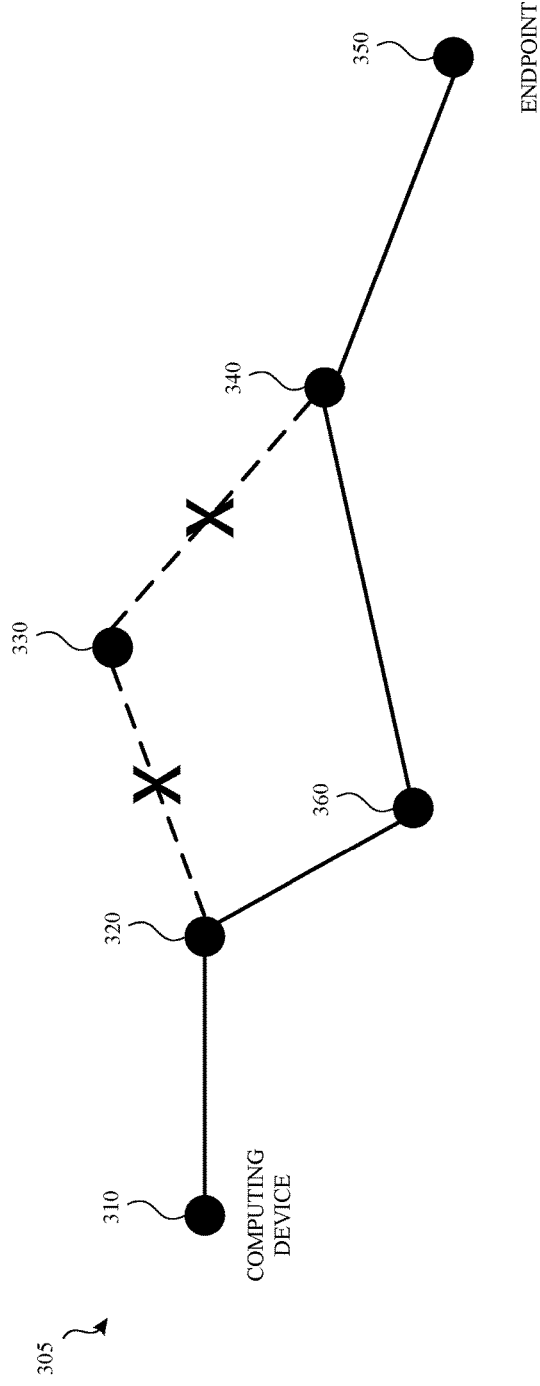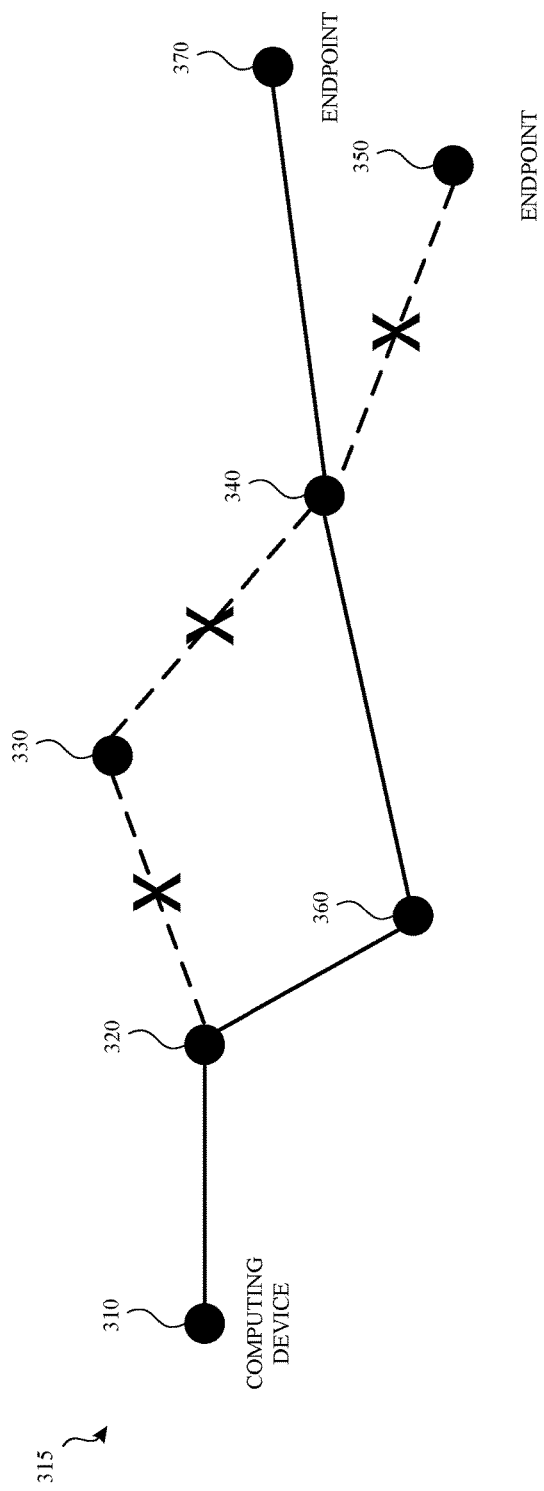

TRIGGERING RECOVERY ACTIONS BASED ON CORROBORATING ANOMALIES

BACKGROUND

Cloud computing offers various computing devices a number of different services. However, if a portion of a network associated with a particular cloud service is down or is congested, an end user's experience with the cloud service is negatively impacted.

SUMMARY

The present application describes a detect, alert and recovery system for various cloud-based and/or network-based services. The detect, alert and recovery system receives network performance data associated with a particular namespace (e.g., www.microsoft.com, www.outlook.office365.com) from various network information sources. The network performance data may be aggregated based on various scopes (e.g., region or network). The aggregated data is analyzed to determine whether an anomaly exists. If an anomaly exists, the detect, alert and recovery system may cause performance of various actions in order to address or otherwise remedy the anomaly.

Accordingly, the present application describes a method in which network performance information associated with a namespace is received from a plurality of network information sources. The network performance information associated with the namespace from each of the plurality of network information sources is aggregated into data sets of varying scope. Each of the data sets of varying scope is analyzed to detect an anomaly associated with the namespace. The anomaly may be analyzed in view of one or more rules in a hierarchy of rules. In an example, the hierarchy of rules is based, at least in part, on one or more of a scope associated with the anomaly and the namespace. An action to address the anomaly may then be performed. In an example, the action to be taken is specified by the one or more rules in the hierarchy of rules.

The present application also describes a system that includes a processor and a memory coupled to the processor. The memory stores instructions that, when executed by the processor, perform operations. In an example, these operations include receiving network performance information associated with a namespace from a plurality of network information sources. The network performance information associated with the namespace is aggregated into data sets of varying scope. Each of the data sets of varying scope are analyzed to detect an anomaly associated with the namespace. Based on detecting an anomaly, an action to address the anomaly is performed. In an example, the action is specified by one or more rules of a rule hierarchy.

Also described is a method that includes receiving a first set of network performance information associated with a namespace from a first plurality of network information sources. The first set of network performance information associated with the namespace from each of the first plurality of network information sources is aggregated into first data sets of varying scope. Each of the first data sets of varying scope are analyzed to determine a presence of an anomaly associated with the namespace. A second set of network performance information associated with the namespace is received from a second plurality of network information sources. The second set of network performance information associated with the namespace from each of the second plurality of network information sources is aggregated into second data sets of varying scope that correspond to the varying scopes of the first data sets. Each of the second data sets of varying scope are analyzed to determine the presence of the anomaly associated with the namespace. Based on the presence of the anomaly being determined using the first data sets and the second data sets, an action to address the anomaly is performed. In an example, the action is specified by the one or more rules in the hierarchy of rules.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

FIG. 3B illustrates an alternate network connectivity path between the computing device and the endpoint associated with the namespace according to an example.

FIG. 3C illustrates another alternate network connectivity path between the computing device and a different endpoint associated with the namespace according to an example.

DETAILED DESCRIPTION

Figure 1A:
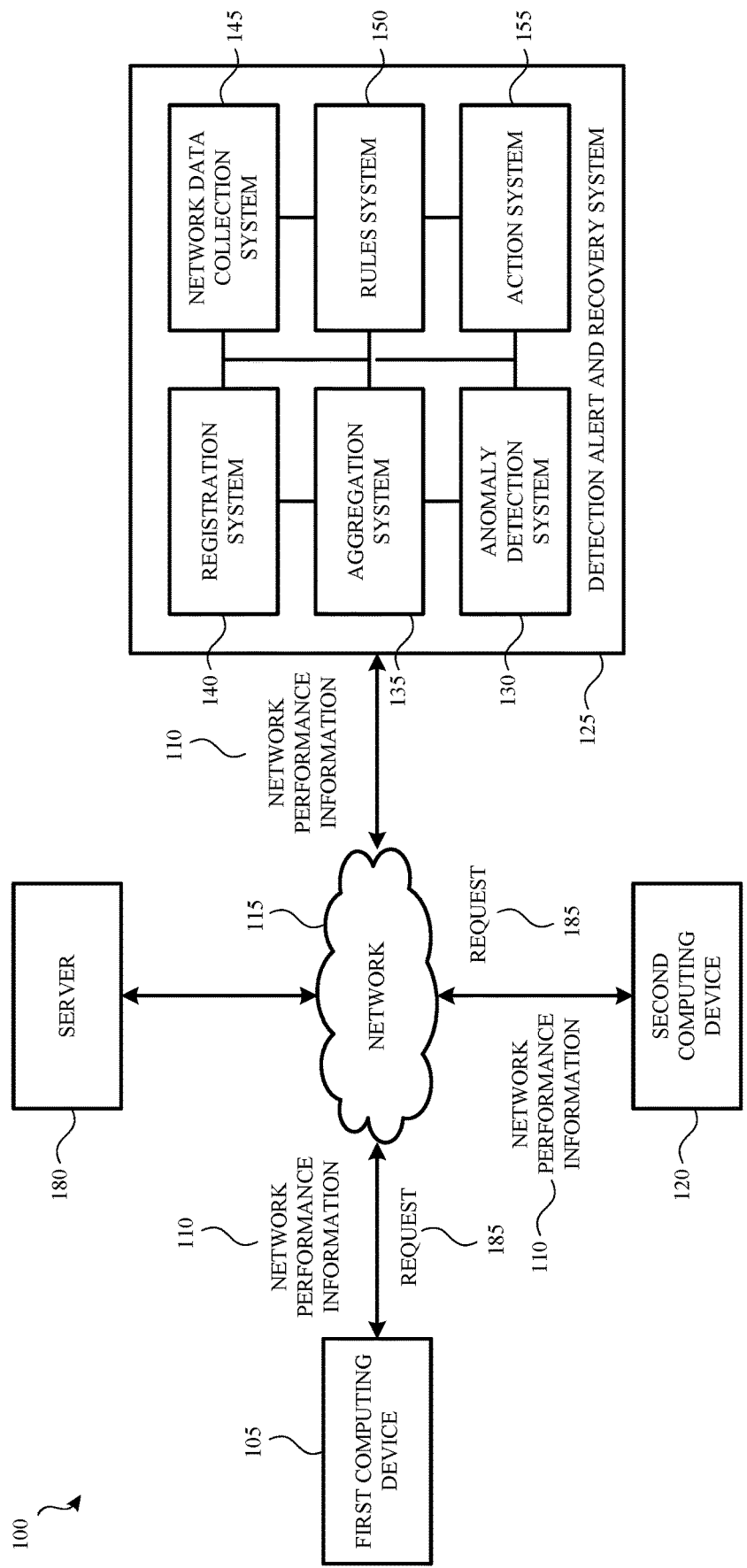
FIG. 1A illustrates an example system for detecting anomalies in a cloud-based and/or network-based service according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Cloud-based and/or network-based services receive and process a number of requests from various computing devices. Often, these requests originate from various parts of the world and are received at a specific namespace (e.g., www.microsoft.com). The namespace may be resolved at different endpoints depending on where the request originated. For example, a computing device that is located in Seattle, may access the endpoint www.seattle.microsoft.com when a request for the namespace www.microsoft.com is provided by a browser of the computing device. Likewise, a computing device located in Atlanta may access the endpoint www.atlanta.microsoft.com when it seeks to access the namespace www.microsoft.com.

When a computing device (e.g., mobile phone, desktop computing device, laptop computing device, gaming machine, smart watch) accesses a particular namespace, an IP address associated with the namespace is determined and the computing device may subsequently connect to that IP address. However, given that various endpoints may be associated with and/or otherwise enable a computing device to access a namespace, it is currently difficult to identify connectivity issues with a particular namespace. For example, it may be difficult to determine whether a namespace connectivity issue is worldwide or regional or whether the namespace connectivity issues originates with an internet service provider.

Accordingly, the present application describes a detect, alert and recovery system for various cloud-based and/or network-based services. The detect, alert and recovery system receives network performance data associated with a particular namespace from various network information sources. The network information sources may be computing devices that access the namespace and/or network telemetry information systems.

When the network performance data is collected (e.g., by various computing devices, by network telemetry information systems and/or by the detect, alert and recovery system), the network performance data may be aggregated into various data sets. In an example, the data sets may be divided or organized based on a scope. In an example, the scope may be based on geographic information associated with the computing device that is seeking to access the namespace, geographic information associated with an endpoint associated with the namespace, and/or network information (e.g., network topology, network service provider information).

The aggregated data is analyzed to determine the presence of an anomaly. In an example, the aggregated data may be compared against previously collected network performance data having the same or a similar scope. In an example, if a difference in performance metrics between the network performance data and the previously collected network performance data is over a threshold, it may be determined that an anomaly exists. As such, the detect, alert and recovery system may initiate various actions in order to address or otherwise remedy the anomaly. The number and/or type of actions that are initiated may vary depending on various factors. These factors include, but are not limited to, the severity of the anomaly, whether the anomaly is corroborated across different data sets and/or between different network telemetry information systems, hierarchical rules, a time at which the anomaly occurs, an amount of time the anomaly has been occurring, and a namespace.

Accordingly, the technical benefits described herein include, but are not limited to, better detection of network-based and/or cloud-based outages when compared with current solutions and an ability to escalate outage alerts and/or to more quickly and efficiently initiate automated recovery actions. Additionally, the systems and methods described herein reduce mean-time-to-detection and mean-time-to-recovery for network and cloud services as the system collects and monitors network data and performs anomaly detection in real-time, near real-time, or at periodic intervals. The system of the present disclosure also enables more accurate detection of anomalies due to anomaly corroboration between various network telemetry information systems.

FIG. 1A illustrates an example system 100 for detecting anomalies of various scopes in a cloud-based and/or network-based service according to an example. When an anomaly is detected or is otherwise identified, the system 100 may invoke alerts and/or recovery actions to enable various computing devices to access a namespace (e.g., an identity namespace) associated with the cloud-based and/or network-based service.

For example, if data from one network telemetry information system or computing device (e.g., first computing device 105) indicates the presence of an anomaly (e.g., the network-based and/or cloud-based service is unreachable, slow, not responsive), certain alerts and/or actions may be invoked by a detection alert and recovery system 125. However, if data from only one network telemetry information system or computing device indicates the presence of anomaly, the detection alert and recovery system 125 may determine that no action is to be taken.

In an effort to increase the reliability of and confidence in the detection alert and recovery system 125, the detection alert and recovery system 125 may utilizes a corroboration technique in which data sets from various network telemetry information systems and/or computing devices may be combined and/or analyzed to determine the presence of an anomaly. This information may also be used to determine a severity of an anomaly and how to address or rectify the anomaly. For example, if data sets from two (or more) network telemetry information systems and/or computing devices indicate the presence of an anomaly, certain alerts and/or actions (or additional alerts and/or actions) may be invoked in order to address the anomaly.

As shown in FIG. 1A, the system 100 may include a first computing device 105 and/or a second computing device 120. Each computing device may submit a request 185 to access a particular namespace (e.g., www.microsoft.com) hosted by or otherwise associated with a server 180. The request 185 may be transmitted to the server 180 via a network 115. Although the first computing device 105 and the second computing device 120 are shown accessing the same network 115 and the same server 180, each computing device may access a different network 115 and/or a different server 180. Additionally, each of the first computing device 105 and the second computing device 120 may provide the same request, similar requests or different requests.

The first computing device 105 may be associated with a first geographic area and the second computing device 120 may be associated with the first geographic area or a second geographic area. For example, the first computing device 105 and the second computing device 120 may be located in Washington State. In another example, the first computing device 105 may be located in Washington State while the second computing device 120 is located in Colorado.

The first computing device 105 and the second computing device 120 may be associated with the same network service providers. In another example, the first computing device 105 and the second computing device 120 may be associated with different network service providers. Although two different computing devices are shown and described, the system 100 may include any number of computing devices that provide requests to access various servers in the system 100.

As the request 185 is transmitted from the first computing device 105 and/or the second computing device 120 to the server 180, network performance information 110 may be collected. Each of the first computing device 105 and the second computing device 120 may provide different network performance information 110 to the server 180. For example, network performance information 110 from the first computing device 105 may indicate that the first computing device 105 is not experiencing any issues while network performance information 110 from the second computing device 120 may indicate that the second computing device 120 is experiencing connectivity issues.

In an example, the network performance information 110 may be associated with a particular namespace (e.g., www.microsoft.com), endpoint and/or server. The network performance information 110 may be provided to the detection alert and recovery system 125 in real-time or substantially real-time. In another example, the network performance information 110 may be collected by the detection alert and recovery system 125 periodically.

The network performance information 110 may be requested by the detection alert and recovery system 125. In another example, the network performance information 110 may be automatically provided to the detection alert and recovery system 125 by the first computing device 105 and/or the second computing device 120. For example, as the first computing device 105 submits the request 185 to the server 180 via the network 115, the first computing device 105 may also provide the network performance information 110 to the detection alert and recovery system 125 via the network 115.

In another example, one or more network telemetry information systems may provide the network performance information 110 to the detection alert and recovery system 125. In another example, network performance information 110 may be provided to the detection alert and recovery system 125 in response to the first computing device 105 executing various connection tests to one or more endpoints and/or namespaces. For example, the detection alert and recovery system 125 may request that the first computing device 105 connect to various namespaces. When the request is received, the first computing device 105 will attempt to connect to the various namespaces and will subsequently provide network performance information 110 for each of the namespaces to the detection alert and recovery system 125 such as previously described.

The network performance information 110 may include information regarding if and/or how the first computing device 105 connected to the endpoint, the namespace and/or the server 180. In another example, the network performance information 110 may include information regarding a location of the endpoint, the server 180 and/or information regarding what server 180 the first computing device 105 connected to when accessing the namespace. For example, the network performance information 110 may include information as to whether the first computing device 105 connected to a server 180 in Seattle, Denver, Hong Kong, etc. The network performance information 110 may also include information regarding a round-trip time, latency, and other network-based performance information, network topology information, network service provider information and the like.

In an example, the network performance information 110 may be provided to the detection alert and recovery system 125 via a web interface executing on the first computing device 105. The network performance information 110 may be automatically provided to or otherwise received by the detection alert and recovery system 125 in real-time, substantially real-time or at periodic intervals. In an example, the network performance information 110 is provided to the detection alert and recovery system 125 via one or more background processes and/or threads executing on or otherwise associated with the various computing devices in the system 100 so as to not be visible to the end user and/or negatively affect a user's experience with the network-based and/or cloud-based services.

In another example, the network performance information 110 may be collected or otherwise transmitted to the detection alert and recovery system 125 when the first computing device 105 (and/or the second computing device 120) connects to a particular website or namespace. For example, when the first computing device 105 connects to a particular website, a browser associated with the first computing device 105 may collect network performance information 110 regarding if and/or how the first computing device 105 was able to connect to the particular website. The network performance information 110 may then be provided to the detection alert and recovery system 125. In an example, this information is provided in real-time, substantially real time and/or periodically (e.g., every five minutes, every ten minutes, every fifteen minutes).

In some examples, successful connections to a particular website are periodically included in the network performance information 110. In other examples, errors or other failures to connect to the particular website are always collected and included with the network performance information 110.

The network performance information 110 may be provided to the detection alert and recovery system 125 via other means such as, for example, external data and/or internal data. For example, a network monitoring system associated with a network service provider may provide network performance information 110 to the detection alert and recovery system 125. In another example, a namespace monitoring system may provide network performance information 110 to the detection alert and recovery system 125.

As shown in FIG. 1A, the detection alert and recovery system 125 may include various systems. Each system works together to detect an anomaly associated with a namespace. When an anomaly is detected, the detection alert and recovery system 125 provides alerts and/or actions (if needed) to address the anomaly. In an example, the various systems shown and described with respect to the detection alert and recovery system 125 may be separate systems. In another example, some (or all) of the systems may be combined. In yet another example, some of the functionality of the systems may be provided by one or more remote computing devices or systems.

The detection alert and recovery system 125 may include a network data collection system 145. In an example, the network data collection system 145 collects and/or stores the network performance information 110. In one example, when network performance information 110 is received and/or stored, an aggregation system 135 aggregates the network performance information 110.

The aggregation system 135 may aggregate network performance information 110 into various data sets based, at least in part, on a determined or specified scope. For example, a scope may be a geographic area (e.g., based on an IP address associated with the first computing device 105 and/or the second computing device 120) from which the network performance information 110 is received. In another example, the scope may be associated with a particular network and/or network service provider. In yet another example, the scope may be boundary—geographic or otherwise—in which an anomaly is detected and/or in which an endpoint or server is located. Although specific examples are given, the system 100 may support any number of different types of scopes.

Additionally, various scopes may be added to the detection alert and recovery system 125 and removed from the detection alert and recovery system 125. In an example, a network technician may add or remove a scope. In another example, an endpoint, a namespace, and/or one or more rules provided by the endpoint or namespace may specify a scope as part of a namespace, endpoint or server registration process (such as described below with respect to FIG. 2).

In an example, various scopes may be associated with a hierarchy. For example, a scope associated with one geographic area (e.g., Seattle) may be a child scope for another geographic area (e.g., Washington State).

As briefly described above, the aggregation system 135 may aggregate network performance information 110 from different computing devices into various data sets. For example, as network performance information 110 is received from the first computing device and the second computing device 120, the aggregation system 135 may aggregate the information into a first data set in order to get a better understanding of a status of the cloud-based and/or network-based service. In an example, the network performance information may be aggregated based on a determined scope or scopes.

For example, the aggregation system 135 may aggregate network performance information 110 based on a determined geographic location of the first computing device 105 and the second computing device 120. In another example, the aggregation system 135 may aggregate network performance information 110 based on a network service provider associated with the first computing device 105 and the second computing device 120. In either example, the scope that is used to aggregate the network performance information 110 may be the same or similar between the first computing device 105 and the second computing device 120. In another example, the scope may be different. For example, the first computing device 105 may be located in Seattle and have a first network service provider while the second computing device 120 may be located in Denver and have a second network service provider.

Figure 1B:
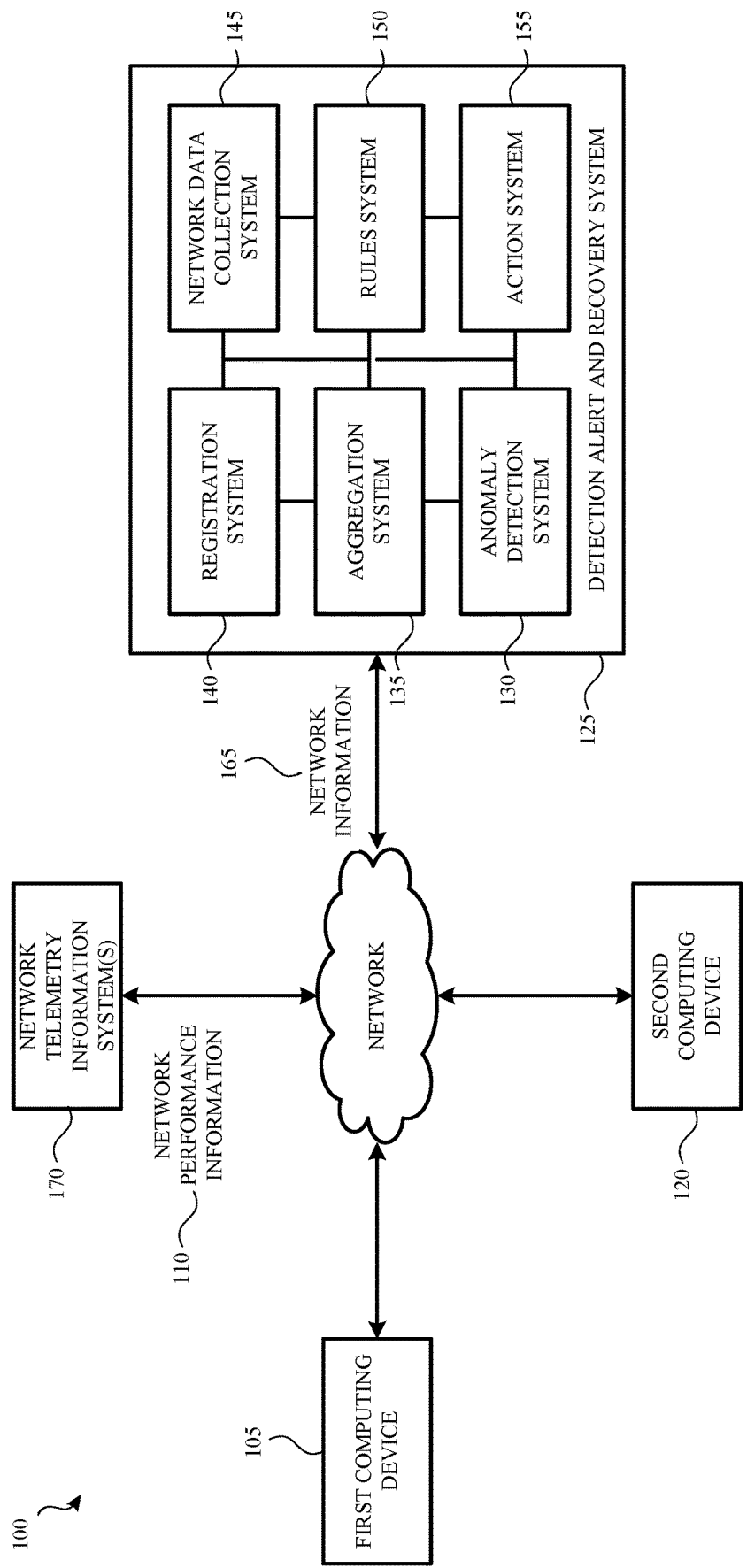
FIG. 1B illustrates the example system of FIG. 1A in which network information is provided to a detection alert and recovery system from one or more network telemetry information systems according to an example.

The aggregation system 135 may also aggregate network performance information 110 from different network telemetry information systems. For example and referring to FIG. 1B, the system 100 may also include network telemetry information system(s) 170. In an example, the network telemetry information system(s) 170 may be separate from, but communicatively coupled to, the detection alert and recovery system 125. In another example, the network telemetry information system(s) 170 may be part of or otherwise integrated with the detection alert and recovery system 125.

The network telemetry information system(s) 170 output or otherwise provide information and/or signals (e.g., network telemetry information) at a high volume and at a high frequency to various databases (e.g., the network data collection system 145 or other databases associated with the network telemetry information system(s) 170). For example and as discussed above, rich clients and/or web interfaces executing on the first computing device 105 and/or the second computing device 120 may upload raw telemetry signals to the detection alert and recovery system 125. This may occur on a regular basis via background threads.

When the telemetry signals are received, the telemetry signals may be enriched with an IP address (or other information associated with or provided by a client computing device and/or network telemetry information system(s) 170 associated with the signal). An anomaly detection system 130 of the detection alert and recovery system 125 may apply a machine learning algorithm to the telemetry signals and/or the various aggregated data sets to compute anomaly score.

The anomaly score may be monitored. When the anomaly score reaches or exceeds a threshold, an action system 155, either alone or in combination with a rules system 150, may determine whether an action should be taken to remedy the anomaly. Although specific examples have been given, signals from various network telemetry information system(s) 170 may be received, combined, and/or used to determine or otherwise detect the presence of an anomaly.

Referring back to FIG. 1A, as network performance information is received 110 and/or aggregated, the network performance information 110 may be compared against historical or otherwise previously received network performance information 110. The historical network performance information may be stored in the network data collection system 145. The anomaly detection system 130 may analyze or otherwise compare the received network performance information 110 with the historical received network performance information in order to detect or otherwise determine an existence of an anomaly.

In an example, the anomaly detection system 130 applies various algorithms to detect an anomaly. In an example, some algorithms may be applied to one data set (e.g., a data set having a first scope) while other algorithms may be applied to a second data set (e.g., a data set having a second scope).

The anomaly may be detected based on lack of signal or a significant variance in a metric against an endpoint for a scope. In an example, the algorithms used to detect an anomaly may be based on machine learning. In another example, the algorithms may be based on aggregations and thresholds. The anomaly detection system 130 may also apply various algorithms based on the namespace associated with the network performance information 110. A timeframe associated with the network performance information 110 may also be considered when determining whether an anomaly exists.

For example, the detection alert and recovery system 125 may determine that on a given day at a given time, and based on network performance information 110, that 0.001% of computing devices in a particular area (e.g., Seattle) cannot access a particular endpoint. However, as network performance information 110 is received and analyzed by the anomaly detection system 130, it may be determined that at a given time-period, 3% of computing devices in that area cannot reach the endpoint. As such, the anomaly detection system 130 may determine that an anomaly exists. Although a jump from 0.001% to 3 percent is specifically mentioned, any threshold may be used.

In one example, when an anomaly is detected, the anomaly may be compared against other data sets of the same scope and/or data sets received from other sources. This comparison/corroboration may increase a confidence score that an anomaly does exist.

The detection alert and recovery system 125 may initiate or invoke different actions based on the confidence score. For example, if data from a first network telemetry information system indicates the presence of anomaly, a first set of actions (or no actions) may be taken. However, if data from a second network telemetry information system also indicates the presence of the anomaly, the confidence score may increase. Accordingly, the first set of action, or a different set of actions may be performed to remedy or otherwise address the anomaly.

When the anomaly detection system 130 detects an anomaly, the anomaly may be compared or otherwise analyzed in light of one or more rules in a rules system 150. Each rule or set of rules in the rule system 150 may be specific to a particular endpoint and/or to a particular anomaly. For example, one endpoint or namespace may have a first rule or set of rules when an anomaly is detected. A second endpoint or namespace may have a second rule or set of rules when an anomaly is detected. In another example, the first endpoint may have a first rule or set of rules when a first type of anomaly is detected and a second rule or set of rules when a second type of anomaly is detected.

In another example, a first rule or set of rules may be applied to the anomaly when information from a single data set (e.g., information from a network telemetry information system 170) indicates the presence of an anomaly. A second rule or set of rules may be applied to the anomaly when information from a multiple data sets (e.g., information from multiple network telemetry information systems 170) indicate the presence of an anomaly. In yet another example, different rules or sets of rules may be applied based on a determined severity, end-user impact and/or scope of the anomaly. In an example, some of the rules may be arranged in a hierarchy. Thus, some rules may take precedence over other rules.

In an example, the following rule may be executed when an anomaly is detected by the anomaly detection system 130: At country level <field> (scope), for if <field> namespace, if an anomaly is detected by the first network telemetry information system (e.g., FootPrint signals or other network telemetry information) and a second network telemetry information system (e.g., Network Error Logging signals or other network telemetry information), take actions A, B, and C. In another example, the following rule may be executed when an anomaly is detected by the anomaly detection system 130: For network service provider <field> (scope) and for <field> namespace, if an anomaly is detected by a first network telemetry information system, take action A and B; if an anomaly is detected by a second network telemetry information system, take action A and C; if an anomaly is detected by a first network telemetry information system and a second telemetry information system, take actions A, B, C, and D. Although specific rules are mentioned, these are for example purposes only.

If the detected anomaly satisfies one or more rules, the action system 155 determines an action to address the anomaly. In an example, the action may be a single action or a series of actions. The actions may occur simultaneously, substantially simultaneously or in sequence. Example actions include, but are not limited to, one or more of the following: generating and sending (or otherwise providing a notification to) a message to a network technician, triggering a network traffic shift, trigger additional data collection, and/or triggering a network health status enquiry.

Figure 1C:
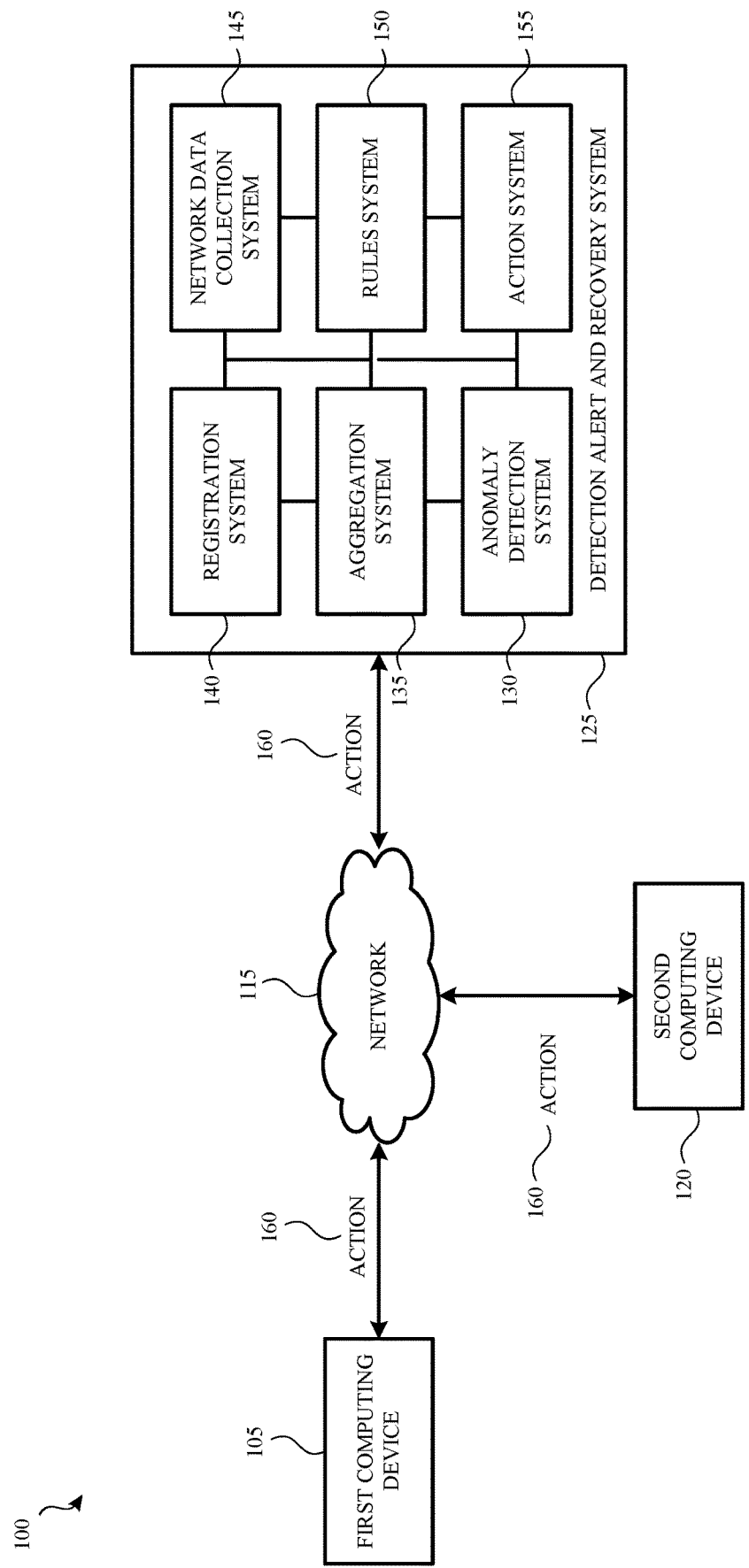
FIG. 1C illustrates the system of FIG. 1A in which the detection alert and recovery system provides instructions to various computing devices that access the system according to an example.
Figure 1D:
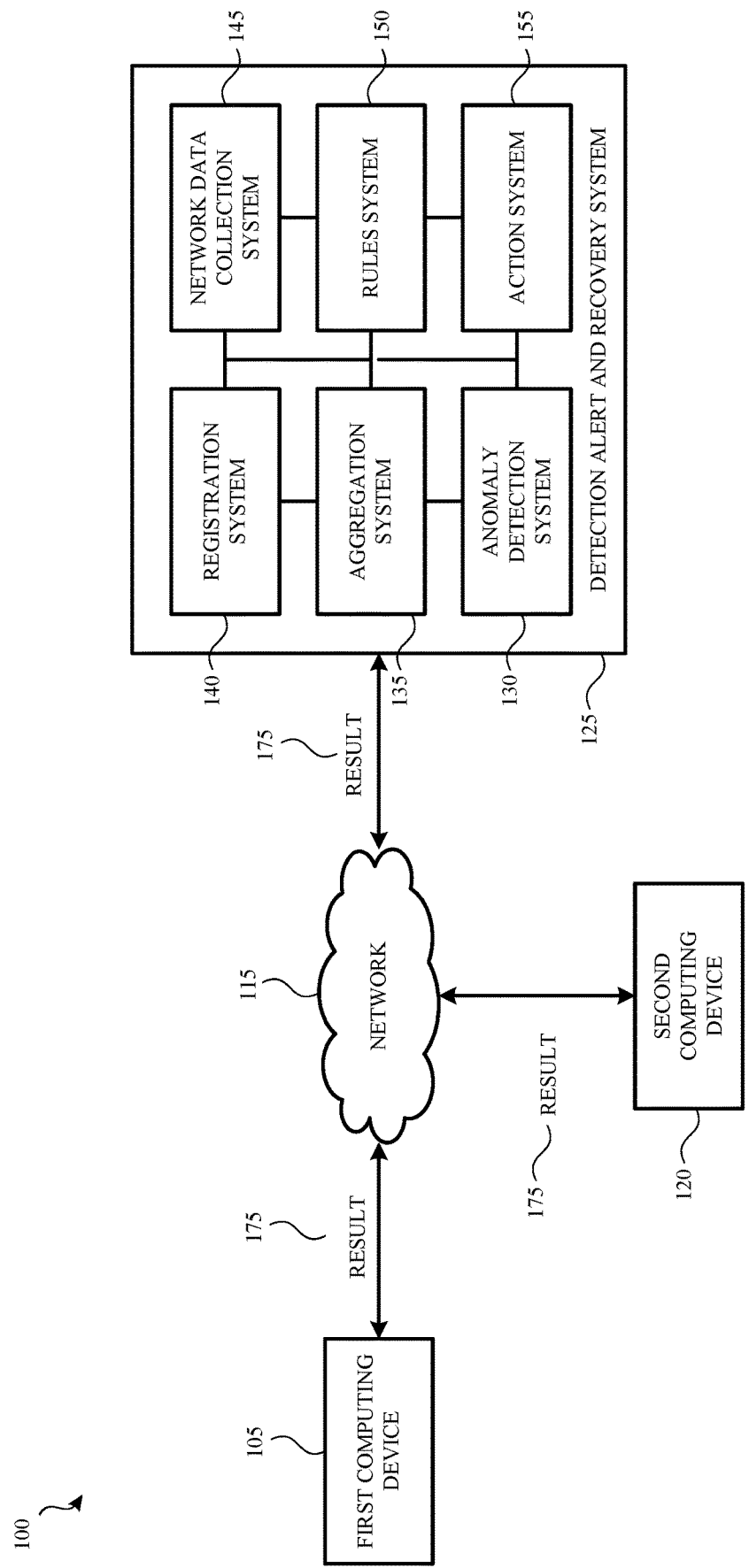
FIG. 1D illustrates the various computing devices providing results information to the detection alert and recovery system according to an example.

Once an action is determined, the detection alert and recovery system 125 provides the action 160 to the various computing devices that are affected by the anomaly. For example and as shown in FIG. 1C, the detection alert and recovery system 125 provides the action 160 to first computing device 105 and the second computing device 120. When the action 160 is received, each computing device may provide results 175 to the detection alert and recovery system such as shown in FIG. 1D. The results may be used by the detection alert and recovery system to determine whether the provided action addressed the anomaly. This information may be subsequently used to change and/or update rules and/or actions when various anomalies are detected.

Figure 2:
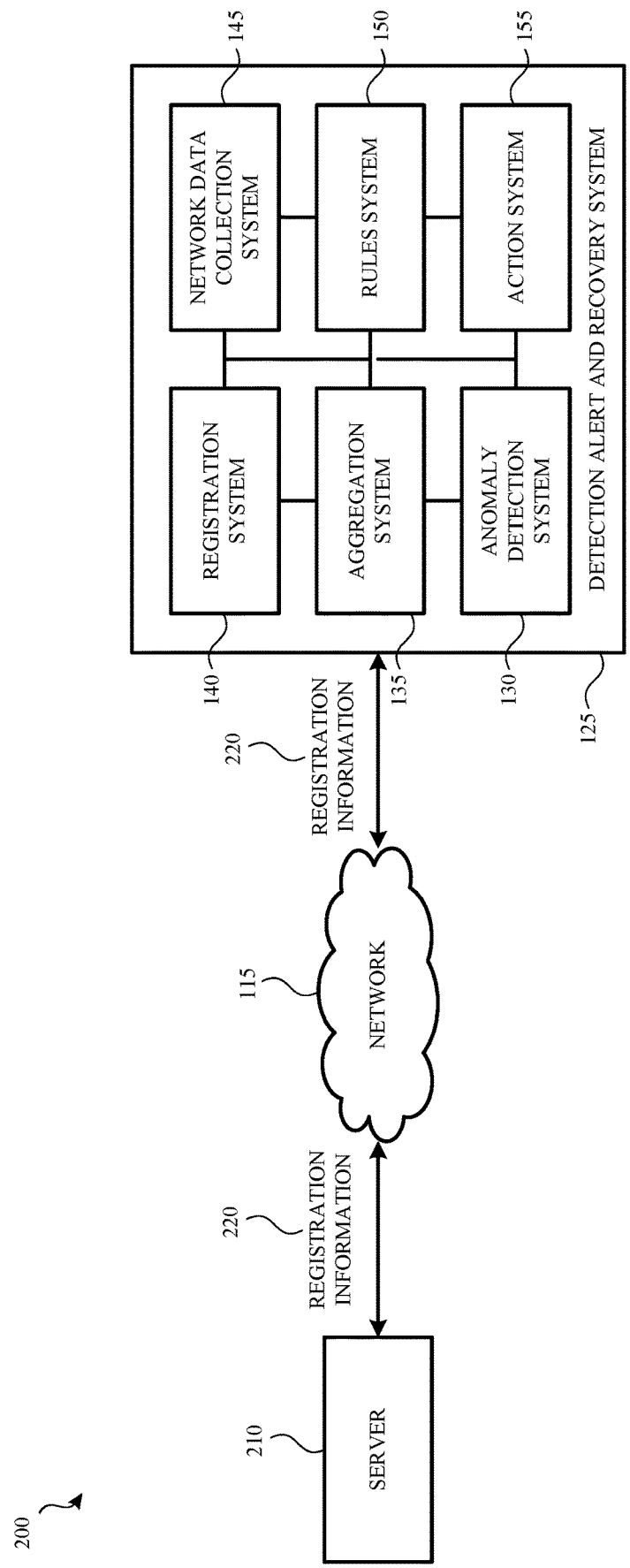
FIG. 2 illustrates a server registering with the detection alert and recovery system according to an example.

FIG. 2 illustrates a system 200 in which a server 210 registers with the detection alert and recovery system 125 of FIG. 1A-FIG. 1D according to an example. In an example, the system 200 may be similar to the system 100 shown and described with respect to FIG. 1A-FIG. 1D. For example, server 210 may be similar to the server 180 of FIG. 1A.

In an example, the server 210 may be associated with a namespace and/or an endpoint. As described above, each endpoint and/or namespace may specify its own unique set of rules and/or actions. However, in order to ensure the rules are analyzed in response to detection of an anomaly and the appropriate or desired action is taken to address the anomaly, the server 210 may register with the detection alert and recovery system 125. As such, the server 210 may provide registration information 220 to the detection alert and recovery system 125 via the network 115. The registration information 220 may include types of actions to be taken when various anomalies are detected, a rule or set of rules to be followed when an anomaly is detected and so on.

Figure 3A:
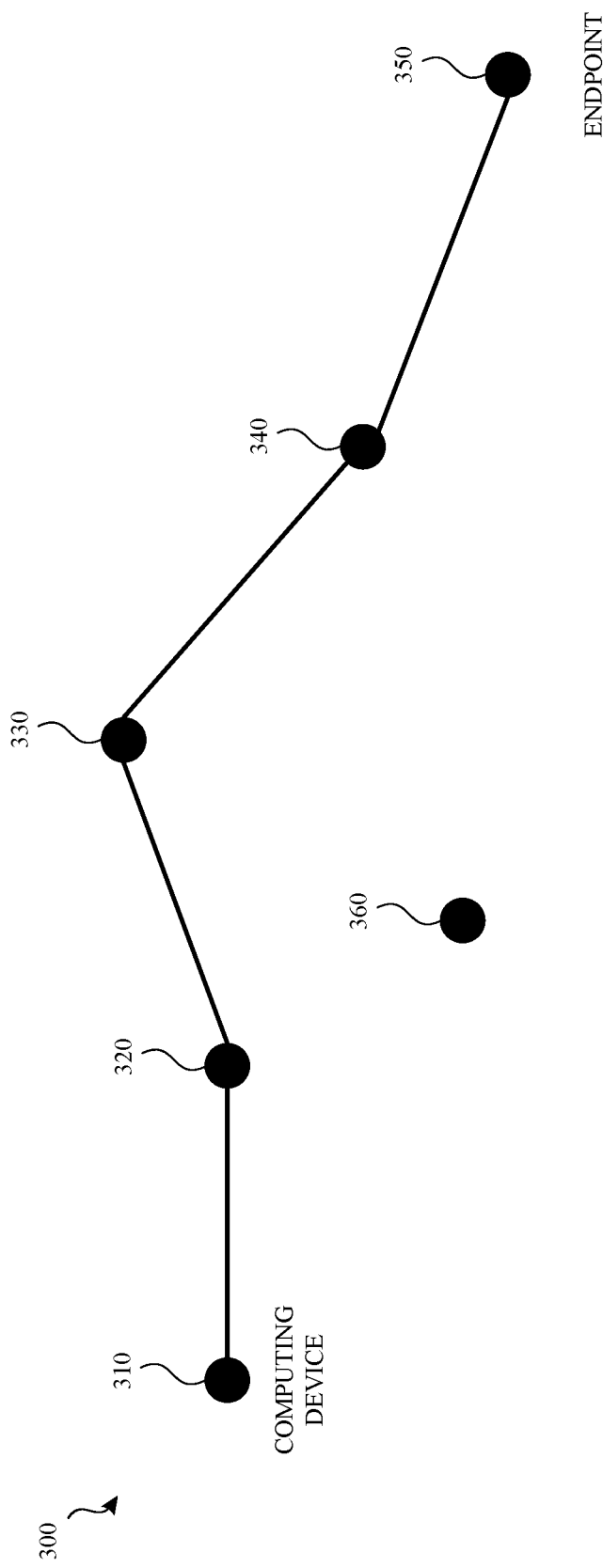
FIG. 3A illustrates an example network connectivity path between a computing device and an endpoint associated with a namespace according to an example.

FIG. 3A illustrates an example network connectivity path 300 between a computing device 310 and an endpoint 350 associated with a namespace according to an example. As shown in FIG. 3A, the path between the computing device 310 and the endpoint 350 may consist of hops at point 320, 330 and 340. However, a detection alert and recovery system may detect the presence of an anomaly caused, for example, by congestion or network failure between points 320 and 330 and points 330 and 340 (indicated by the X in FIG. 3B).

In order to address this anomaly (and in response to one or more rules being satisfied), the detection alert and recovery system may instruct the computing device 310 to use an alternate network connectivity path such as, for example, the network connectivity path 305 shown in FIG. 3B. As shown in FIG. 3B, the computing device 310 may now connect to the same endpoint 350 using points 320, 360 and 340.

In another example, the detection alert and recovery system may instruct the computing device to access a different endpoint associated with the namespace. The different endpoint may be in a different geographic region than the original endpoint. For example and as shown in FIG. 3C an alternate network connectivity path 315 between the computing device 310 and a different endpoint 370 associated with the namespace may include hops at points 320, 360 and 340. Although network traffic rerouting is shown as an example action that may address a detected anomaly, alternative actions and/or additional actions may be taken.

Figure 4:
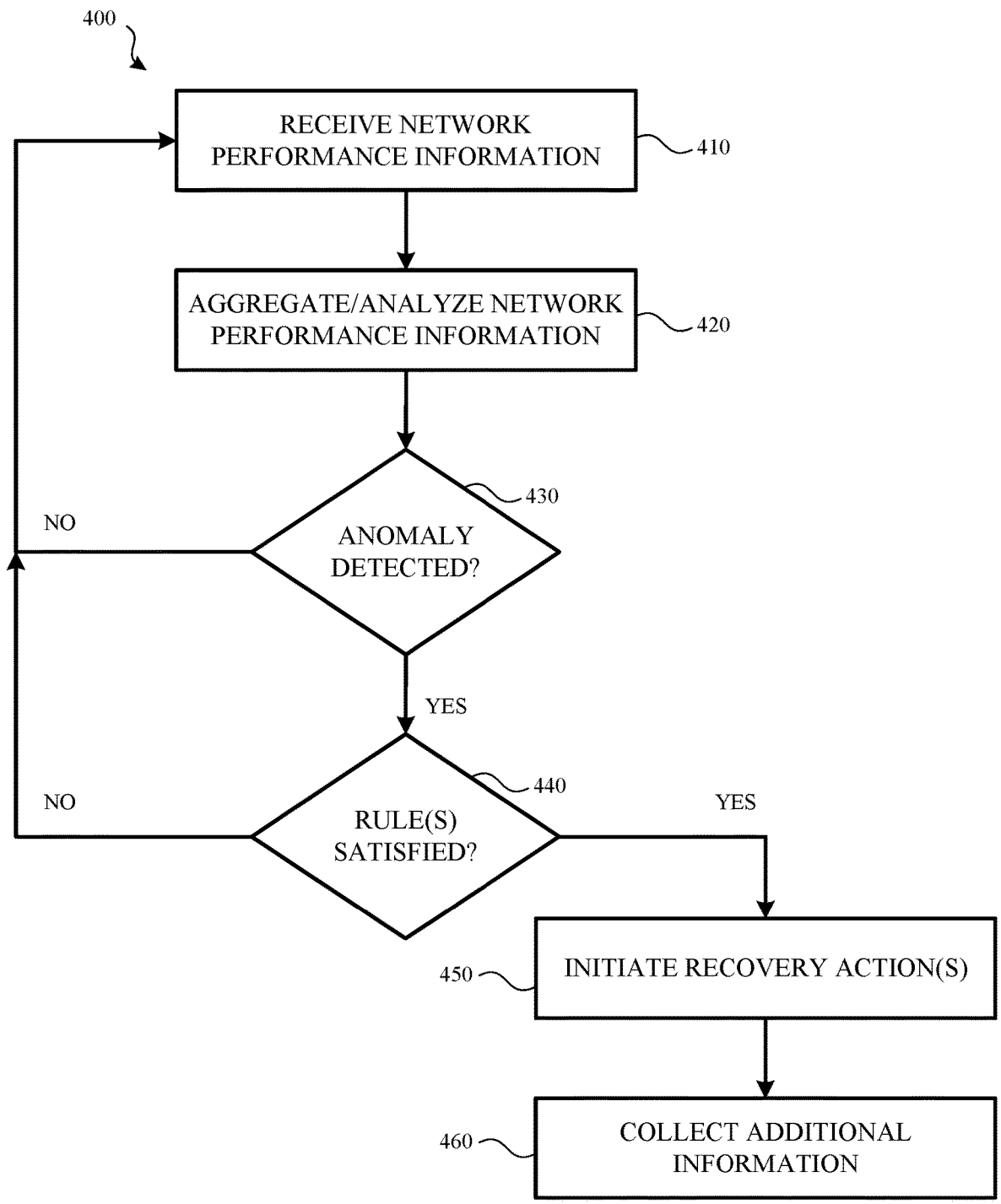
FIG. 4 illustrates a method for detecting an anomaly in a cloud-based and/or network-based environment according to an example.

FIG. 4 illustrates a method 400 for detecting an anomaly in a cloud-based and/or network-based environment according to an example. The method 400 may be executed by the system 100 or the various systems described with respect to FIG. 1A-FIG. 1D.

Method 400 begins when network performance information is received. In an example the network performance information may be received by a detection alert and recovery system. In an example, the network performance information may be actively collected by the detection alert and recovery system. For example, the detection alert and recovery system may request that one or more client device connect to one or more namespaces and collect network performance information based on the attempted connections.

In another example, one or more computing devices may provide network performance information to the detection alert and recovery system in response to various events. These events may include, but are not limited to, the computing device connecting to a particular endpoint and/or namespace, the computing device connecting to a particular cloud-based or network-based service, or an inability of the computing device to connect to a particular namespace and/or endpoint.

In another example, network performance information may be provided to the detection alert and recovery system by one or more network telemetry information systems. In an example, each network telemetry information system may provide the same or similar network performance information data in the same or similar format. In another example, each network telemetry information system may provide different network performance information data in a different format. In such a case, an anomaly detection system may standardize the information as part of an anomaly detection process. In another example, the network telemetry information system may provide the network performance information in a format requested by an anomaly detection system associated with the detection alert and recovery system.

In yet another example, network performance information may be provided to the detection alert and recovery system by individuals associated with various computing devices that access the system. For example, an individual may provide information that a particular segment of a network is down, that a cloud-based service is non-responsive or is congested, etc. In another example, network performance information may be provided to the detection alert and recovery system from a network service provider or other third party.

The network performance data may include or otherwise be based on various scopes. These scopes may include region information (e.g., city, country, country, worldwide etc.) and/or network information. The network performance data may also include routing information between a computing device and an endpoint, performance metrics of a particular network or network segment, a geographical location of the endpoint, an amount of time it took to connect to the endpoint, a network topology, internet service providers, intermediate internet service providers, throughput and so on.

Once the network performance information is received, the detection alert and recovery system may aggregate and/or analyze the network performance information to determine (430) whether an anomaly is detected. Although not required, data aggregation may occur over different data sets having the same scope or different scopes. Additionally, data sets from two different sources (e.g., computing devices, network telemetry information systems) may be aggregated and analyzed.

In an example, an anomaly is detected by comparing the network performance information with historical network performance information. If the comparison indicates an anomaly (e.g., performance metrics associated with an endpoint have changed over a threshold amount), an anomaly may exist. In another example, the network performance information is provided to various anomaly detection algorithms that determine whether an anomaly exists. In yet another example, different data sets (of the same or similar scope, or data sets with different scopes) from different sources may be analyzed in view of each other. As such, different data sets may be used together in order to increase a confidence level that an anomaly exists.

If an anomaly is not detected, flow returns to operation 410 and additional network performance information is collected and/or received. However, if an anomaly is detected, the anomaly is compared against one or more rules in a rules hierarchy to determine if one or more of the rules are satisfied (440). As discussed above, the rules in the rule hierarchy may be specific to an endpoint or a namespace. In addition, a rule or set of rules may be specific to a particular scope, a severity of an impact of the anomaly, an amount of time the anomaly has been occurring and so on.

If one or more rules are not satisfied, flow returns to operation 410 and additional network information is received. However, if a rule is satisfied, the detection alert and recovery system may cause the performance or initiation (450) of one or more recovery actions. The recovery actions are initiated to address the anomaly. The recovery actions may be an alert and/or a notification action (e.g., notification of a network technician), a network traffic shifting action (e.g., such as shown in FIG. 3A-FIG. 3C), a network heath analysis action, a data collection action or a combination thereof.

Once an action is invoked, the detection alert and recovery system may receive additional information (460) regarding whether the recovery action addressed the anomaly or whether additional actions are needed.

Figure 5:
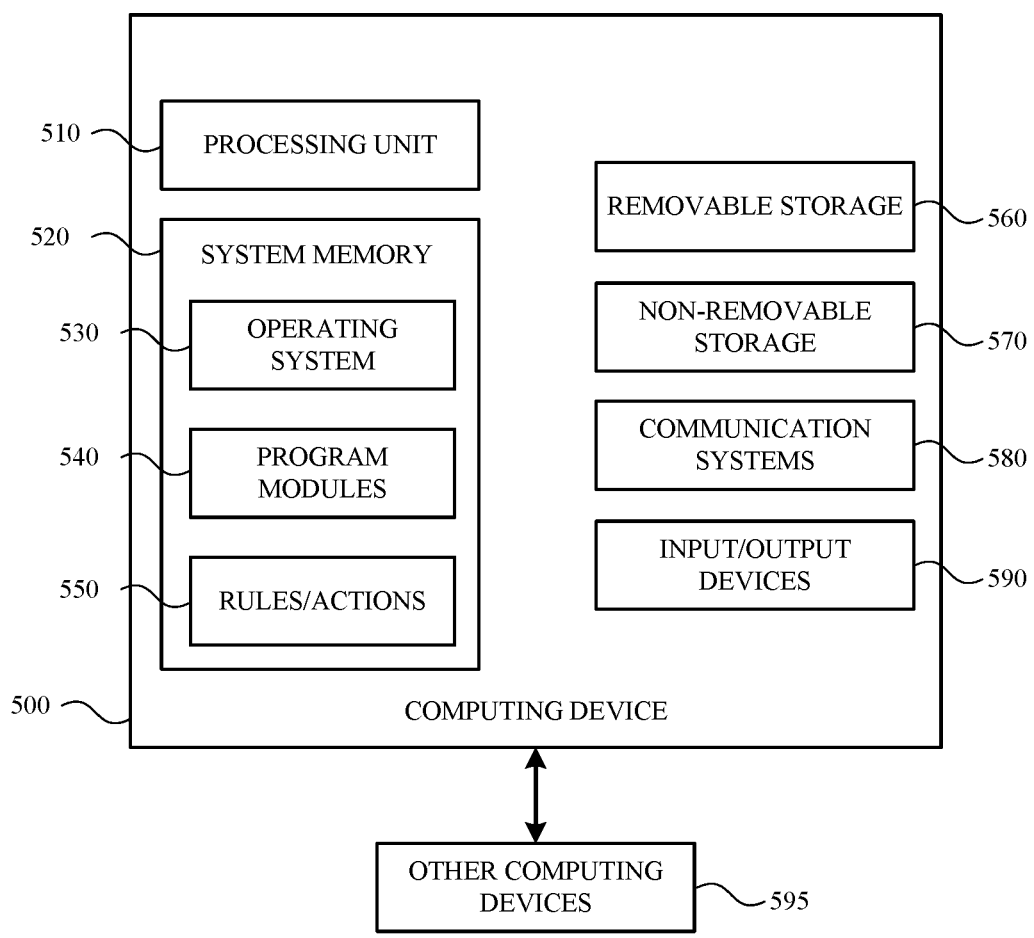
FIG. 5 is a block diagram of a computing device according to an example.

FIG. 5 is a system diagram of a computing device 500 according to an example. The computing device 500, or various components and systems of the computing device 500, may be integrated or associated with a detection alert and recovery system, a computing device, a server as well as the various systems described herein. As shown in FIG. 5, the physical components (e.g., hardware) of the computing device are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for detecting anomalies, executing rules and/or actions 550 and so on. A number of different program modules and data files may be stored in the system memory 520. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
    receiving network performance information associated with a namespace from a plurality of network information sources, wherein the namespace can be resolved at a plurality of endpoints, including at least a first endpoint and a second endpoint;
    aggregating the network performance information associated with the namespace from each of the plurality of network information sources into data sets of varying scope, wherein the plurality of network information sources includes at least a computing device that accesses the namespace, and the network performance information includes at least a round-trip time or a latency between the computing device and an endpoint of the namespace;
    analyzing each of the data sets of varying scope to detect an anomaly associated with the namespace;
    analyzing the anomaly with respect to one or more rules in a hierarchy of rules, the hierarchy of rules being based, at least in part, on a geographic scope associated with (1) the anomaly and (2) at least one of the plurality of endpoints; and
    causing performance of an action among a plurality of actions to address the anomaly, the action being specified by the one or more rules in the hierarchy of rules, and the plurality of actions including at least an action of causing network traffic from a client computing device to the first endpoint to be rerouted to the second endpoint.

2. The method of claim 1, further comprising associating the anomaly with a score.

3. The method of claim 2, wherein analyzing the anomaly with respect to one or more rules in the hierarchy of rules occurs when the score associated with the anomaly is above a threshold.

4. The method of claim 1, further comprising:
    receiving additional network performance information associated with the namespace from a second plurality of network information sources;
    aggregating the additional network performance information associated with the namespace from each of the second plurality of network information sources into additional data sets of varying scope; and
    analyzing the additional data sets of varying scope to verify a presence of the anomaly.

5. The method of claim 4, wherein analyzing the anomaly with respect to one or more rules in the hierarchy of rules occurs when analysis of the data sets and analysis of the additional data sets verify the presence of the anomaly.

6. The method of claim 4, wherein the data sets of varying scope are provided by a first network telemetry information system and the additional data sets of varying scope are provided by a second network telemetry information system.

7. The method of claim 1, wherein the hierarchy of rules is specific to the namespace.

8. The method of claim 1, wherein the hierarchy of rules is specific to the anomaly.

9. The method of claim 1, wherein the action is associated with a determined severity of the anomaly.

10. The method of claim 1, wherein the network performance information includes network topology information.

11. The method of claim 1, wherein the scope is associated with a geographic region.

12. The method of claim 1, wherein the scope is associated with a network.

13. A system, comprising:
a processor; and
a memory coupled to the processor and storing instructions that, when executed by the processor, perform operations, comprising:
receiving network performance information associated with a namespace from a plurality of network information sources, wherein the namespace can be resolved at a plurality of endpoints, including at least a first endpoint and a second endpoint;
aggregating the network performance information associated with the namespace into data sets of varying scope, wherein the plurality of network information sources includes at least a computing device that accesses the namespace, and the network performance information includes at least a round-trip time or a latency between the computing device and an endpoint of the namespace;
analyzing each of the data sets of varying scope to detect an anomaly associated with the namespace;
analyzing the anomaly based, at least in part, on a geographic scope associated with (1) the anomaly, and (2) at least one of the plurality of endpoints; and
based on detecting the anomaly, causing performance of an action among a plurality of actions to address the anomaly, the action being specified by one or more rules of a rule hierarchy, and the plurality of actions including at least an action of causing network traffic from a client computing device to the first endpoint to be rerouted to the second endpoint.

14. The system of claim 13, wherein one of the plurality of network information sources is a computing device.

15. The system of claim 13, further comprising instructions for analyzing the anomaly with respect to one or more rules in the rule hierarchy.

16. The system of claim 15, wherein the rule hierarchy is based, at least in part, on one or more of a scope associated with the anomaly and the namespace.

17. The system of claim 13, further comprising instructions for:
receiving additional network performance information associated with the namespace from a second plurality of network information sources;
aggregating the additional network performance information associated with the namespace from each of the second plurality of network information sources into additional data sets of varying scope; and
analyzing the additional data sets of varying scope to verify a presence of the anomaly.

18. The system of claim 17, wherein the data sets of varying scope are provided by a first network telemetry information system and the additional data sets of varying scope are provided by a second network telemetry information system.

19. The system of claim 13, wherein the scope is associated with at least one a geographic region or a network.

20. A method, comprising:
receiving a first set of network performance information associated with a namespace from a first plurality of network information sources;
aggregating the first set of network performance information associated with the namespace from each of the first plurality of network information sources into first data sets of varying scope, wherein the first plurality of network information sources includes at least a first computing device that accesses the namespace, and the first set of network performance information includes at least a round-trip time or a latency between the first computing device and a first endpoint of the namespace;
analyzing each of the first data sets of varying scope to determine a presence of an anomaly associated with the namespace;
receiving a second set of network performance information associated with the namespace from a second plurality of network information sources;
aggregating the second set of network performance information associated with the namespace from each of the second plurality of network information sources into second data sets of varying scope that correspond to the varying scopes of the first data sets, wherein the second plurality of network information sources includes at least a second computing device that accesses the namespace, and the second set of network performance information includes at least a round-trip time or a latency between the second computing device and a second endpoint of the namespace;
analyzing each of the second data sets of varying scope to determine the presence of the anomaly associated with the namespace, wherein the namespace can be resolved at a plurality of endpoints, including at least the first endpoint and the second endpoint;
analyzing the anomaly with respect to one or more rules in a hierarchy of rules, the hierarchy of rules being based, at least in part, on a geographic scope associated with (1) the anomaly, and (2) at least one of the plurality of endpoints; and
based on the presence of the anomaly being determined using the first data sets and the second data sets, causing performance of an action among a plurality of actions to address the anomaly, the action being specified by the one or more rules in the hierarchy of rules, and the plurality of actions including at least an action of causing network traffic from a client computing device to the first endpoint to be rerouted to the second endpoint.

* * * * *